Figure 1:
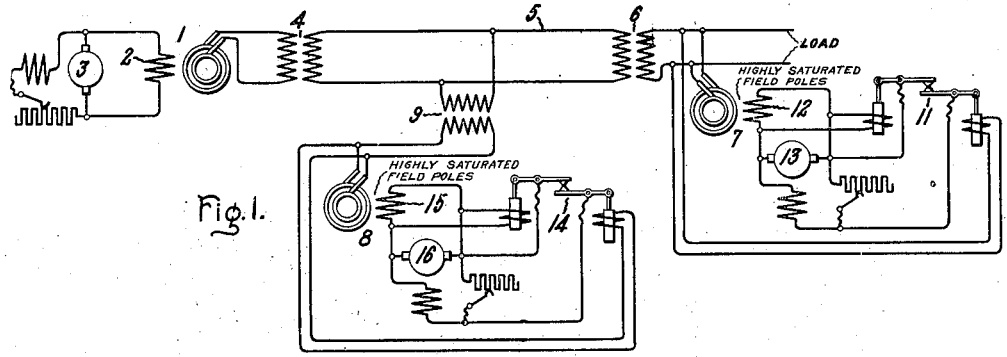
Figure 2:
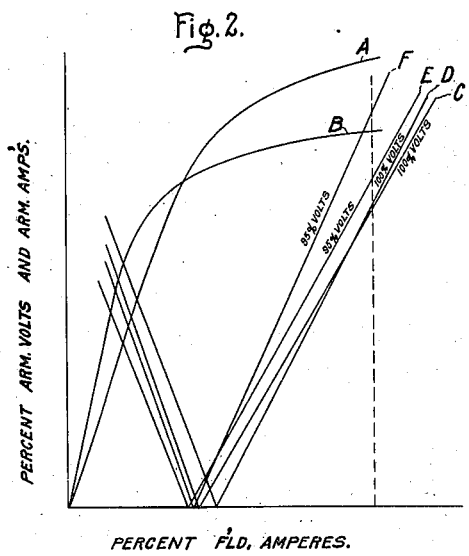
Figure 3:
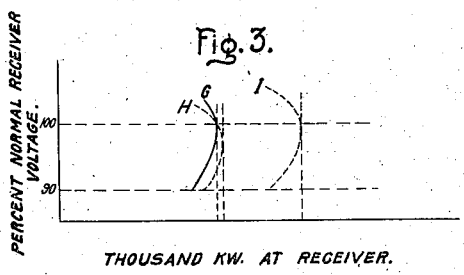

Sept. 6, 1927.   N. C. CHRISTENSEN   1,641,736
APPARATUS FOR FILTRATION
Filed Jan. 19, 1921   3 Sheets-Sheet 1
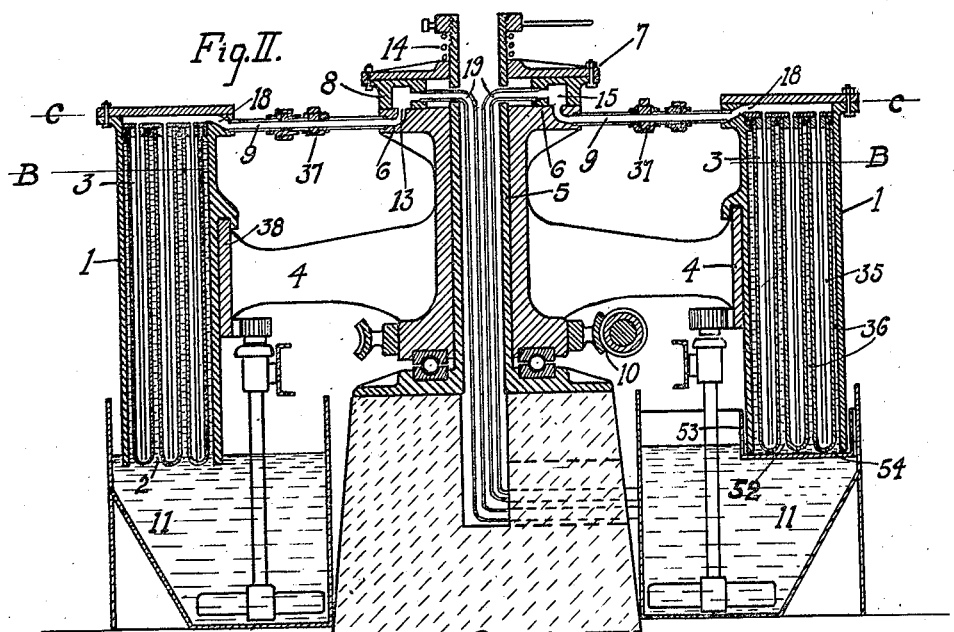
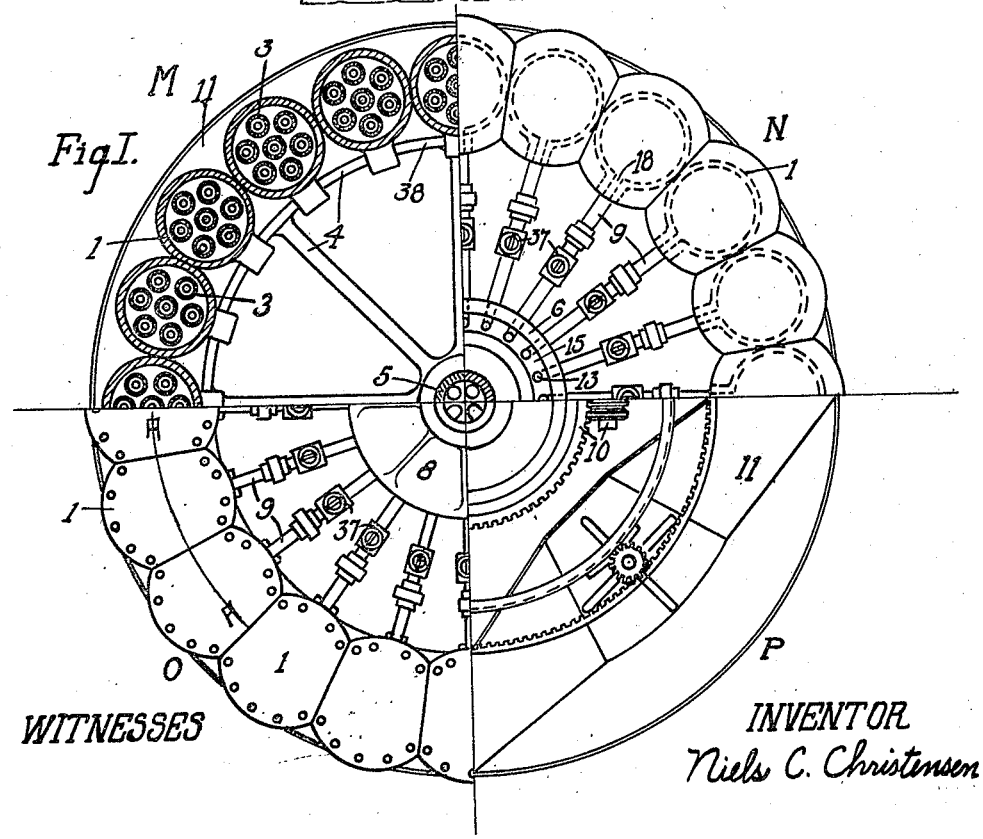
WITNESSES
INVENTOR
Niels C. Christensen

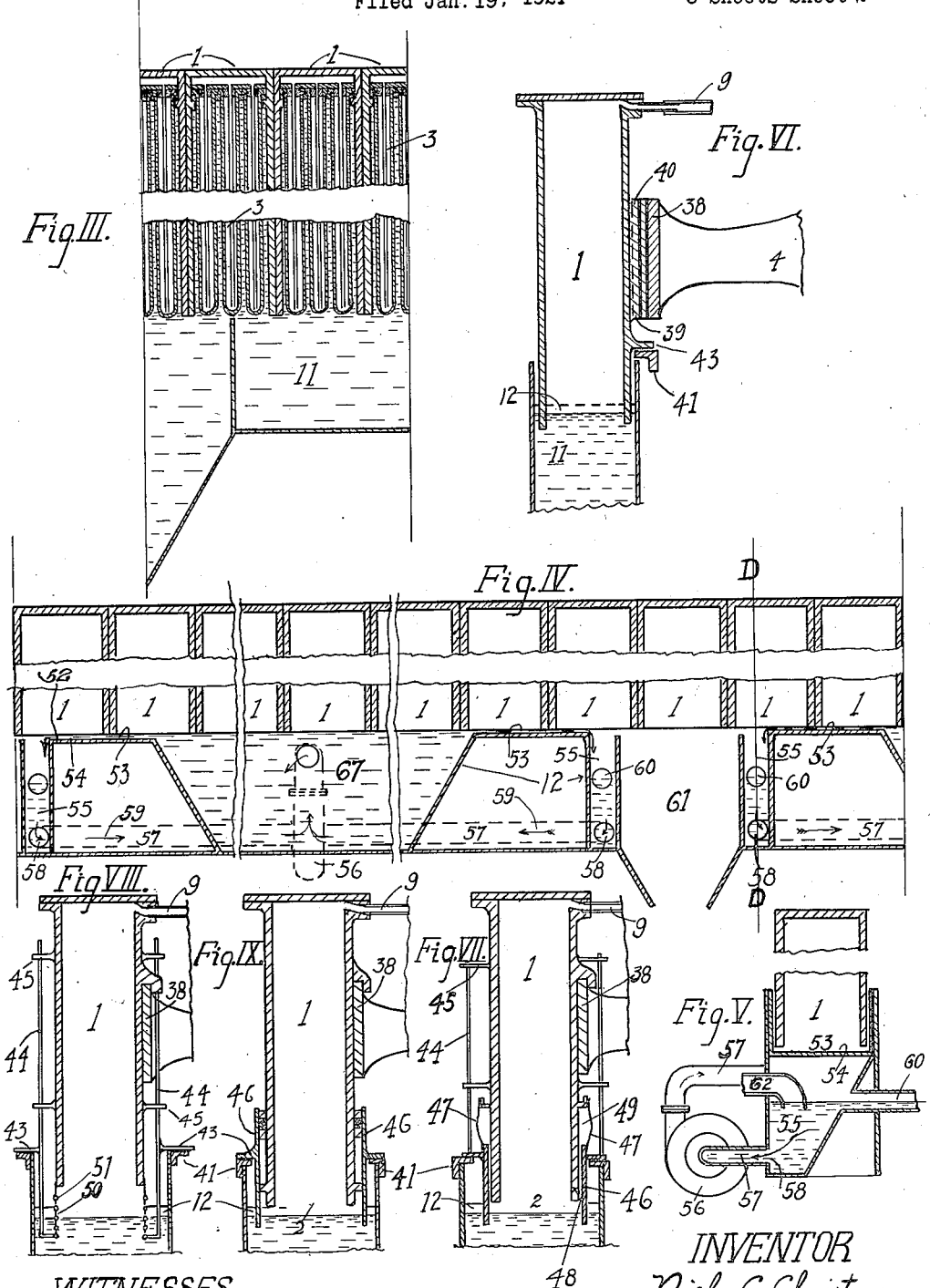

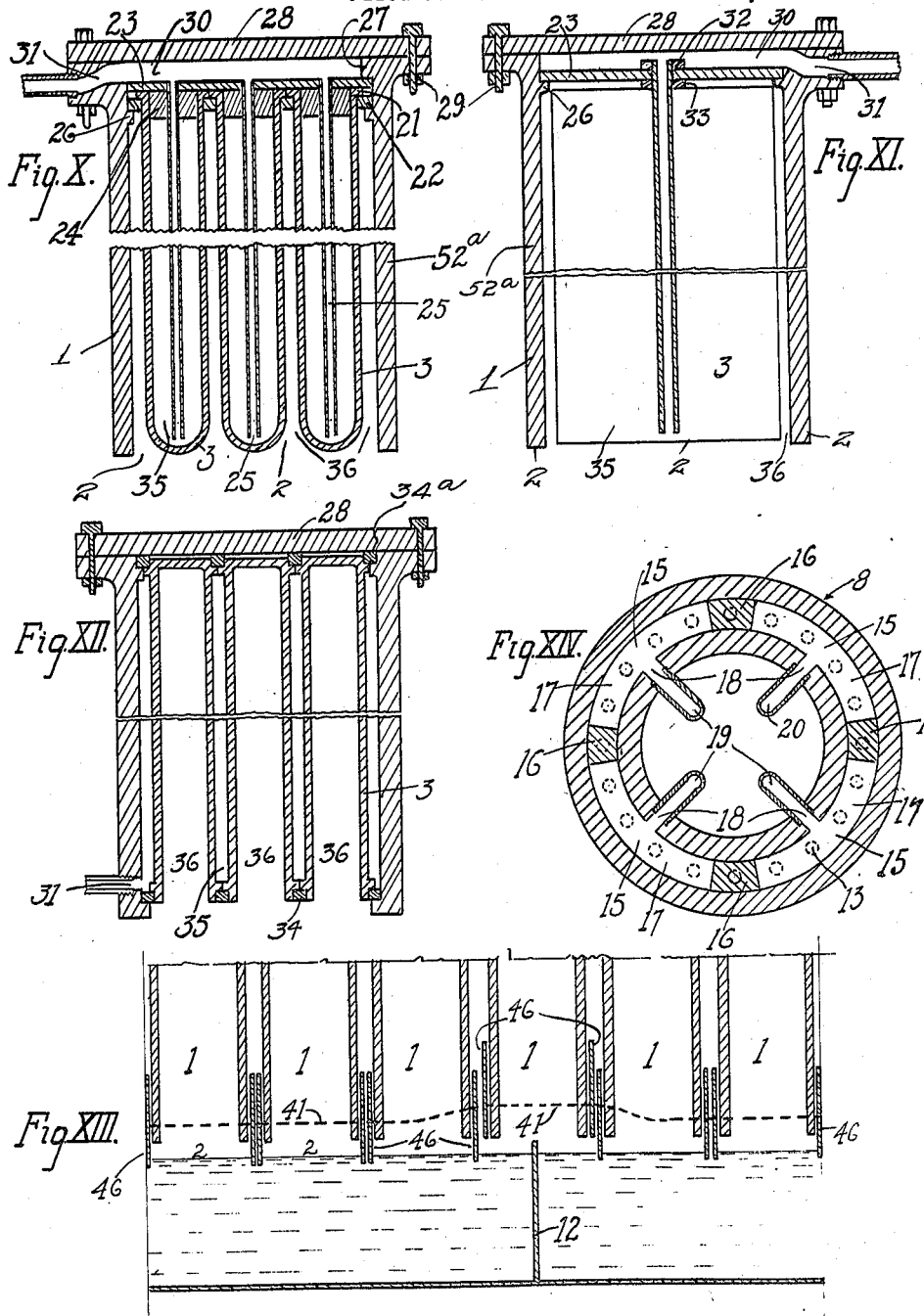

Patented Sept. 6, 1927.

1,641,736

UNITED STATES PATENT OFFICE.

NIELS C. CHRISTENSEN, OF SALT LAKE CITY, UTAH.

APPARATUS FOR FILTRATION.

Application filed January 19, 1921. Serial No. 438,372.

This invention relates to improvements in vacuum filters and methods of vacuum filtration. It is the object of the invention to secure a combination of all the separate advantages of the different types of vacuum filters combined in a simple continuously operating device.

In the two types of vacuum filters commonly used each have advantages and disadvantages not possessed by the other. The disadvantages of the leaf or basket type of filter are that, it is intermittent in operation, requires large storage tanks, the basket of filter leaves must be handled by suitable lifting devices and cranes or the pulp and solutions must both be handled by a relatively complicated system of storage tanks and pipes and valves, either of which require constant attention and labor, the capacity per square foot of filter medium is low due to the relatively thick filter cake which must be used due to the intermittent operation. The main advantages of this type of filter are the thorough washing of the filter cake which may be secured and that it is possible to use a counter-current method of washing.

The advantages of the rotary type of filter of either the drum or disk type are its continuous automatic operation which requires little attention, and the high capacity per unit area of filter surface due to the continuous automatic operation which makes possible the use of a relatively thin filter cake. The main disadvantages of this type of filter are the difficulty of securing a good wash and the practical impossibility of using a counter-current method of washing as the liquids for washing must be applied by means of sprays.

It is the object of my invention to secure all the advantages of these types of filters together with other advantages not possessed by either of these types, and to do this in a simple continuously operating automatic device requiring a minimum of attention in operation and easily adjusted and repaired.

My filter is continuous and automatic in operation and has therefore all the advantages of the rotary drum or leaf filter. Its method of washing is similar to the intermittent leaf or basket type of filter, in that the filter cake is surrounded by the wash solutions during the washing of the cake, and it has therefore the main advantages of this type of filter. My filter also has the great advantage that a counter-current method of washing may be very efficiently used. It has also the great advantage that it may easily be made acid proof. It is also very simple in construction and easily repaired.

The invention consists in general of a number of separate vertical chambers open at the bottom and containing a number of vertical filter leaves or tubes. The chambers are arranged so as to form a practically continuous ring about a central vertical axis around which the chambers move in an annular path.

A central automatic valve controls the application of suction and pressure and the withdrawal of solutions from the sets of filters in each chamber. Each chamber thus forms an independent unit. The filter tanks consist preferably of an annular trough divided into separate sections for containing the pulp, the wash solutions, and the discharged cake. The surface of the pulp and solutions is maintained constantly at practically the same level in all the compartments at all times. Suitable agitators prevent settling of the pulp. The suction chambers of the filter are arranged so that the lower part of each chamber dips slightly into the pulp and solutions in passing around the annular path, the main parts of the filter chambers being entirely above the level of the pulp or solutions in the annular trough or tank. As noted the chambers are entirely closed except at the bottoms, which dip into the pulp or solution at the places where the vacuum is applied to the filter media. When a vacuum is applied inside of the filter media and the chambers dip into the solution or pulp, the pulp or solution is drawn up into the chamber filling it and surrounding the filter media. In this way the solution is drawn through the filter medium and the cake is formed thereon, and washed without lifting or lowering of the filter leaves or without transfer of the pulp or wash solutions, and the action of the filter in cake forming, washing and discharge is continuous and automatic as in rotary filters of the drum and disc type (which revolve on about horizontal axes).

It will thus be seen that my apparatus secures all the advantages of the intermittent leaf type of filter combined with all the advantages of the continuous rotary type of filter.

The foregoing is only a general statement of the method of operation of the filter which may be constructed in general in three different ways to suit the conditions under which it is designed to operate. In one arrangement the filter chambers are connected so as to form a rigid structure or are merely divisions of an annular chamber. In this case all the lower edges of the chambers move at all times in the same horizontal plane a short distance beneath the surface of the pulp and wash solution. In this case the lower parts of the filter chambers pass through a notch in the upper edge of the partitions which divides the filter tank (i. e. the annular trough or container for the pulp and solutions) into separate compartments for pulp and solutions. The solutions and pulp in this case are maintained at the same level (by suitable overflows) so that there is practically no tendency for any flow from one compartment of the tank into another through the notch in the upper edge of the portions through which the lower part of the ring of filter chambers moves. In this case the cake is preferably discharged into water (or solution) which is kept at the same level in the discharge compartment as the pulp and solutions in their compartments. This arrangement of my filter is especially applicable for simple filtering without washing.

In another arrangement, the partitions which separate the filter tank into compartments for pulp solution and discharge extend above the level of the pulp and solutions and the cakes are discharged "dry", i. e. not into water or solution, and the lower part of the filter chambers must be lifted over each of these separating partitions as the filter chambers revolve. In one of these arrangements each chamber is lifted separately necessitating a flexible connection (hose or flexible jointed pipe) between each filter chamber and the central valve. In the other of these arrangements the lower part of each chamber is supplied with an extension which may be automatically lifted up over the partitions and be let down into the pulp or solution so that the main part of each chamber is not lifted and is rigidly connected to the central supporting mechanism and valve. This is accomplished in either of two ways, by means of a flexible extension which may be lifted over the partitions and then be dropped into the pulp or solution or by means of a rigid extension making a close fit on the main part of the chamber or connected thereto by a flexible membrane.

In a third general arrangement no part of the filter chambers are lifted over the partitions but pass through a notch therein and the solutions and pulp in adjacent sectors of the trough are kept separate and their mixing prevented by suitable auxiliary overflow sectors at both ends of each main sector from which the liquid overflowing through the notches is returned to the main sector.

As will be noted all these arrangements are essentially the same, the entire general arrangement of chambers, driving and supporting mechanism central valve and trough being practically the same, with slightly different methods of bringing the lower parts of the filter chambers into the liquids in separate sectors of the trough and at the same time keeping these liquids separate.

The filter construction may be of two different types, the common type consisting of leaves or tubes of suitable shape around the outside of which the filter cake is formed, or tubes of different suitable shapes on the inside of which the cake is formed.

The foregoing general statements will be made clear by the following more detailed description of the accompanying drawings and methods of operation of the invention.

Fig. I shows a general plan of the arrangement of the filter and Fig. II a vertical section on a diameter and Fig. III a vertical section on a circular line A—A of this plan, showing the general arrangement of filter chambers, central valve and trough for pulp and solution. The section on A—A is shown as a plane surface, the circular surface being straightened to a plane. In Fig. I the quadrant M shows a horizontal section on B—B, quadrant N a section on C—C, quadrant O a plan view and quadrant P shows the trough and driving mechanism.

Figs. I, II and III show the simplest arrangement in which the bottom of filter chambers move at all times in the same horizontal plane i. e. are not lifted over any partitions.

Fig. IV shows a vertical section on a circular line A—A illustrating a means of discharging a dry cake from the foregoing arrangement and means for preventing mixing of solutions from adjoining sections of the trough.

Fig. V shows a vertical section on a diameter D—D showing this notch in the trough through which the lower part of the filter chambers are passed in this method of arrangements of the invention.

Figs. VI, VII, VIII and IX show partial vertical sections on diameters of the apparatus illustrating various methods by which the lower parts of the filter chambers may be lifted over the partitions in the trough. Figs. X, XI, and XII are vertical sections of filter chambers showing different forms of filter medium and different arrangements of these in the filter chamber which may be used. Fig. XIII a vertical section on a circular line A—A showing the partitions over which the lower part of the chambers must be lifted and indicating the lifting rail. Fig. XIV is a horizontal section of the central automatic valve illustrating the connections of the filters to the vacuum and pressure pipes.

As previously stated the apparatus consists of a number of vertical filter chambers (1) which are open at the bottom (2) and contain a number of suitably arranged filter tubes or leaves (3). The filter chambers are supported by a suitable horizontal spider or frame or wheel (4) which is arranged to revolve slowly around a central vertical column or axis (5) so that the filter chambers form a ring around this central vertical axis and move in an annular path around this axis. Rotating about this central axis and connected with the spider or wheel supporting the filter chambers is the rotating part (6) of the central automatic valve (7). The stationary part (8) of this valve is supported by the central column (5) so that it is symmetrical around the same vertical axis as the moving part (6). The moving part (6) of the valve (7) is connected to each of the filter chambers (1) by the pipes (9) which revolve with the chambers (1) and moving part (6) of the valve and through which vacuum and pressure are applied to the filter medium in each chamber and through which the solutions are withdrawn. The supporting wheel or spider (4) is turned on the central column (5) by a suitable driving mechanism (10). Beneath the ring of filter chambers is a suitable, preferably annular, trough (11) in which the pulp to be filtered and the different wash solutions are contained. The trough is divided into separate compartments for this purpose by the radial partitions (12).

The central automatic valve (7) consists of a moving part (6) to which the pipes (9) from each filter chamber are connected each one preferably having its individual outlet hole (13) all of which are symmetrically arranged in a circle around the central vertical axis of the valve. The moving part (6) of the valve and the stationary part (8) meet each other in smooth plane surfaces (or valve face or seat) in the horizontal plane C—C and are held together under sufficient pressure to form a tight joint by a suitable spring (14) around the central column (5). The stationary part (8) of the valve has an annular slot or trough (15) whose central line is approximately of the same diameter as the circle passing through the centers of the holes (13). The slot (15) and the holes (13) open into each other on the surface or plane C—C between the stationary and moving parts of the valve 6 and 8 respectively. The fillers (16) divide the annular slot or trough (15) into separate sectors (17) from which the openings (18) lead to the outside pipes (19) through which the vacuum is applied and through which the solution is withdrawn and to the outside pipes (20) through which air or water under pressure may be applied to the filter medium to release the cake. The number and arrangement of the different sectors (17) of the stationary part (8) of the valve and their outside pipes (19) and (20) will depend upon the nature of the work to which the filter is applied and may be either a simple operation in which only two sectors (17) and a single solution and vacuum pipe (19) and a single pressure pipe (20) may be used for a simple filtration, or a large number of such sectors (17) and pipes (19) arranged for counter-current washing by filtration. The operation of a valve of this kind is so well understood that a more detailed description is unnecessary, the general arrangement being such that the holes (13) connected with certain of the filter chambers (1) open into suitable sectors (17) as the chambers move around the circle so that vacuum and pressure are applied as desired in different parts of the path according to the particular filtering operation being conducted.

The filter chambers (1) and filter medium may vary in construction, the essential requirement being that the chamber is closed except at the bottom which dips into the pulp or solution and that the vacuum and pressure) is applied to the open part of the chamber through the filter medium. Two different types differing somewhat in construction but similar in operation, may be used. The type illustrated in Figs. X and XI consists of a chamber (1) open at the bottom (2) in which the filter leaves or tubes (3) are suspended. Fig. X shows a design for use with filter tubes (3). The filter tubes (3) are closed at the bottom and are held in position by the ring (21) at the upper end which is held between the plate (22) through which the tube passes and the upper plate (23). The tube is closed at the upper end by a suitable cork or plug (24) through which the pipe (25) passes. The pipe (25) extends from near the bottom of the filter tube (3) through the plate (23). The plates (22) and (23) are clamped together between the lugs (26) and (27) on the inside wall of the chamber (1) and the cover plate (28). The cover plate (28) is bolted to the walls of the chamber (1) by suitable bolts (29) and leaves an open space (30) above the plate (23) into which the pipes (25) open. The channel (31) opens from this space (30) into the vacuum and pressure pipes (9), through which vacuum and pressure are applied. This type of construction is especially well suited to being made acid proof since the wall (52$^a$) and cover plate (28) of the chamber (1) may be made of any suitable material such as porcelain, lead, bakelite, bronze, or other suitable acid proof material, and the filter tubes (3) may be made of crushed and graded particles of fused alumina or quartz moulded and baked with suitable bonding material to make a porous medium, or of porous porcelain, acid resisting metal, cloths, etc., and the plates (22) and (23) of such materials as bakelite, porcelain, bronze or other suitable material. The tube (25) may be of glass, porcelain or other acid proof material, and the cork (24) of rubber, acid-proof cements or other suitable material. In work with strong acids such as HCl and $H_2SO_4$, and with acid brine solutions, extending over a long period, I have found porous tubes of fused alumina to be a most excellent filtering medium, being relatively strong, resistant to the action of strong acid solutions and an excellent filtering medium of low resistance which does not clog up or become obstructed like many other filter media. As will be readily seen tubes are easily removed and replaced by removing the cover (28).

The construction for using filter leaves instead of tubes shown in Fig. XI is similar to that just described except that only a single plate (23) may be used through which the pipe (25) passes and is held in place by the lock nut (32) and lug (33) on the pipe (25).

The other type of arrangement referred to above is shown in Fig. XII. In this case the tubes (circular or rectangular preferably the former) are closed at the upper end and held in position between the lower perforated plate (34) and the upper perforated plate (34ª) through which the tubes pass. Said plate (34ª is held in place by the cover plate (28) as before described. The opening (31) connects with the vacuum and pressure pipes (9). As will be seen in this case the filter cake is formed inside of the tube instead of outside. The action of the filter chambers is as follows: When the vacuum is applied from the central valve (7) through the pipes (9) and passage (31) to the space (35) enclosed by the filter medium, and the lower part of the chamber (1) dips slightly into the pulp, the pulp is drawn up into the open space (36) around the filter medium and solution is drawn through the filter medium and a cake formed thereon. To wash this cake the lower part of the chamber is dipped slightly into the wash solution and the vacuum applied as before and solution is drawn up into the space (36) and through the filter cake. To discharge the cake, air (or water) under pressure is applied from the central valve (7) through the pipes (9) and passage (31) to the space (35) enclosed by the filter medium and the cake thus loosened and dropped from the filter medium.

The filter chambers (1) should preferably be separate units readily attached to and detached from the wheel or supporting frame (4) and pipes (9) for repair, and the pipes (9) should preferably each be supplied with a suitable valve (37) by which they may be closed so that any filtering chamber may be removed and repaired without interfering with the operation of the apparatus as a whole.

As previously stated, in the forms of the apparatus used for washing as well as filtering the pulp and the different solutions in the trough (11) may be kept separate by suitable radial partitions (12) which may or may not extend entirely above the solution or pulp level. In the former case the lower part of the filter chambers (1) must be withdrawn from the pulp or solution and lifted over the partitions and dipped slightly into the solution on the opposite side in passing around the annular path. This may be accomplished in two different ways, by slightly lifting and lowering the entire filter chamber (1) or by the lifting of a lower portion of the chamber which is connected with the main upper part of the chamber in such a manner as to be movable and yet so as to form a continuous closed space so the vacuum may be applied and solution and pulp drawn up into the chamber as previously described. If the filter chamber is lifted as a whole a flexible joint or hose connection must be used in the pipe (9). The lifting of the chambers (1) may be accomplished in the manner shown in Fig. VI. The chambers are held to the rim (38) of the supporting wheel or spider (4) by suitable guides (39) in which the sliding piece (40) attached to the chamber (1) may slide up and down. A suitable stop or lug in the guides holds the chamber at its lowest position so that the lower part of the chamber (1) dips slightly into the pulp or solution. At the partitions the elevated portion of the guide rail (41) (see Fig. XIII) lifts the chamber (1) upward in the guides (39) and over the partition (12) and allows it to drop to its lower position again.

The use of a movable lower portion of the chamber may be accomplished in several ways as shown in Figs. VII, VIII and IX. Fig. VII shows my preferred method. In this construction a loose fitting sleeve (46) surrounding the lower part of the chamber (1) and held in place by suitable rods (44) and guides (45) so that this sleeve (46) may be moved up and down by the guide rail (41) as these come in contact with the lifting lug (43) on the sleeve as the chamber passes around the circle is used. The sleeve (46) is connected to the main part of the filter chamber (1) at a suitable distance above the top of the sleeve by a flexible membrane (47) so that there is no opening into the chamber (1) except through the open bottom (2) of the sleeve (46). This arrangement operates as follows: In its lowest position the lower part of the sleeve dips into the pulp or solution and when the vacuum is applied, the solution or pulp is drawn up inside the chamber (1) and closes the space (48) between the sleeve (46) and chamber wall (1) and traps the air enclosed in the space (49) and prevents the upward flow of pulp and solution in this space and thus prevents their coming into contact with the membrane (47). In this way the pressure both inside and outside of the membrane (47) is also made practically equal and the membrane is not subjected to any severe strain. When the chamber (1) reaches a position near a partition wall (12) over which it must be lifted, the guide rails (41), or other lifting device, coming in contact with the lifting lugs (43) on the sleeve (46) lift the sleeve up out of the solution or pulp and over the partition and then allow the sleeve to pass downward and dip into the solution or pulp on the other side of the partition as the chamber moves around the circle. Only a very small up and down movement of the sleeve (or of any of the lifting devices) is required since the pulp or solution level may be maintained near the top of the partition and the bottom of the sleeve (46) or chamber (1) dips but very slightly into the pulp or solution. The device shown in Fig. IX is similar to the one just described except that the sleeve (46) has a close fitting machined or packed joint between it and the main part of the chamber. Another method or construction is shown in Fig. VIII in which there is a flexible extension (50) from the bottom of the chamber (1) supported by suitable rigid rings (51) so as to prevent collapse of the flexible tube and held in position by suitable rods (44) which extend through guides (45) and lifted by means of the lifter lugs (43) and the guide rails (41), or other lifting devices, as previously described. The action of these arrangements is similar to that described for Fig. VII.

If it is not desired to use any of the lifting constructions such as described, the pulp and different solutions may be kept separate with no mixing and the filter cake may be discharged dry (i. e. not into the solution) without any lifting of the chambers or any lower part thereof, by the means illustrated in Fig. IV, which is a vertical section on a circular line within the trough, the section being shown as having been rolled out plane, and in Fig. V which is a partial vertical section on a diameter. In this method of construction the bottom of the chambers all move in the same horizontal plane and pass through a relatively closely fitting notch (52) in each of the partitions (12). Extending out into each pulp or solution sector (67) of the main trough (11) from the notch (52) at each end of the sector is a shallow trough (53) of the same shape in vertical section as the notch (52) through which trough (53) the chambers (1) pass toward or away from the notch (52) Figure 4. In this case the solution or pulp levels are maintained slightly above the bottom (54) of the trough (53) or notch and above the bottom of the chambers (1). This causes a slight leak of solution or pulp through the trough (53) and out of the notch (52) between the lower part of the chambers (1) and the bottom and sides of the trough (53). This overflow from the notch in the ends of the sectors (67) passes into the overflow sectors (55) and is returned to the sector (67) from which it came by a suitable pump (56) (or other lifting device) through suitable pipes (57) and holes (58) as indicated by the arrows (59). The trough (53) and bottoms of the chambers (1) should form a comparatively close fit so that the leak through the notches will be relatively small under the slight head required for the dipping of the lower ends of the chambers slightly into the pulp or solution and the capacity of the pump (56) should be ample to care for this leak. A suitable overflow (60) from each overflow sector (55) to a supply tank should preferably be provided and the pulp or solution for each sector 67 should preferably be supplied with a constant regulated supply from this supply and storage tank through a suitable pipe or launder (62) (Fig. V). In this way a constant level in the sectors (67 and 55) may be maintained and the lower part of the chambers (1) may be kept immersed in solution or pulp in the sectors (67) without any lifting of the chambers or any mixing of different pulps or solutions. The level of pulp in the overflow sectors (55) should preferably be considerably below the level in the main sectors (67). The manner of discharging the dry cake from such an arrangement is the same as just described the discharge hopper (61) having overflow sectors (55) and notches (52) and troughs (53) on both ends so that the chambers (1) may pass out of the sectors (67) and over the hopper (61) where the filter cake is discharged and falls into the hoppers (61) without any flow of solution into this hopper.

The operation of my invention for different purposes in different applications will be so apparent from the foregoing that a very brief general description of different methods of operation will be sufficient for those familiar with filter devices.

For a simple filtering operation without washing (i. e. dewatering or clarifying) in which the filter cake may be discharged into the liquid and removed from a hopper in the trough (11) by a suitable underflow device or drag, the simplest form of chambers, trough and valve are used. The chambers in this case are without lifting devices of any kind and move around the circle dipping slightly into the liquid at their lower points during the entire cycle. The trough is also without partitions above the surface of the liquid, but may have partitions beneath to form a discharge hopper for the removal of the filter, or to prevent excessive mixture of solution or pulp in different parts of the trough. The central valve (7) applies the vacuum during the entire movement of each chamber (1) around the circle except above the discharge hopper where pressure is applied to release the cake which falls off the filter medium and settles into the discharge hopper and is removed in a wet condition. For combined filtering and washing operations the pulp and solutions should be separated and kept from mixing and in this case partitions are necessary. In this case one of the lifting devices must be used if the partitions extend above the liquid level or overflow and return devices may be used in each sector as described and the lifting devices be done away with. In any case the operation is similar in that the lower parts of the chambers dip into the pulp or solution in each sector and pass from one sector to another around the circle and discharge a dry (i. e. free from excess moisture) filter cake without mixture of different liquids or flow of liquid into the discharge sector. The vacuum and pressure are applied by the central valve at suitable points in the passage of the chambers around the circle. The drying time between sectors may be regulated by the length of time the bottom of each chamber is kept out of the liquid between the sectors by means of the adjustment of the length of guide rail in the lifting devices and the width of overflow or separating sectors (55) between the pulp and solution sectors (67).

The length of drying before discharging the cake may be regulated by the length of the discharge space (61). The application of the vacuum is of course regulated by the central valve to correspond to the foregoing.

For counter current washing the solutions are passed from sector to sector in counter current to the movement of the chambers. It will be apparent that my invention is especially well suited for counter current washing since any number of sectors may be used and the central valve may readily be constructed to conform to these.

From the foregoing description and the drawings it will be seen that my device secures and combines all the advantages of both the intermittent and continuous rotary vacuum filters, without their disadvantages, in a compact automatic filter device which is simple in construction and operation and easily and quickly repaired.

As it will be apparent that it would be impossible in the scope of a patent application to give all the possible variations in detail of construction and operation which might be used in my invention and it is also apparent that the drawings are more or less diagrammatic and I do not therefore desire to be limited entirely by the foregoing description and drawings except as set forth in the appended claims.

Having described my invention what I desire to patent and hold is:

1. The apparatus for separating liquids from finely divided solids by filtration which consists of a vertical chamber closed at the sides and top and having suspended therein vertical partitions of filtering medium so arranged as to form of a portion of the space within said chamber vertical spaces which are entirely enclosed except for openings through which vacuum and pressure may be applied thereto, together with means for dipping the lower end of said chamber slightly into liquid pulp to be filtered.

2. The apparatus for separating liquids from finely divided solids by filtration which consists of a vertical chamber closed at the sides and top and having suspended therein vertical partitions of filtering medium arranged so as to form of a portion of the space within said chamber vertical spaces which are entirely enclosed except for openings through which vacuum and pressure may be applied thereto together with means for dipping the lower end of said chamber slightly into liquid pulp to be filtered, all arranged so that when the lower end of said chamber is dipped slightly into a liquid pulp and a vacuum is applied to said enclosed spaces that said liquid pulp will be drawn up into and fill the space within said chamber outside of said enclosed spaces and liquid will be drawn through said partitions of filter medium into said enclosed spaces and solids in suspension in said liquid pulp will be deposited on the outside side of said partitions of filtering medium.

3. The apparatus for separating liquids from finely divided solids by filtration which consists of a vertical chamber closed at the sides and top and having suspended therein vertical partitions of filtering medium so arranged as to form of a portion of the space within said chamber vertical spaces which are entirely enclosed except for openings through which vacuum and pressure may be applied thereto, together with means for dipping the lower end of said chamber slightly into liquid pulp to be filtered, all arranged so that when the lower end of said chamber is dipped slightly into a liquid pulp and a vacuum is applied to said enclosed spaces that said liquid pulp will be drawn up into and fill the space within said chamber outside of said enclosed spaces and liquid will be drawn through said partitions of filter medium into said enclosed spaces and solids in suspension in said liquid pulp will be deposited on the outside side of said partitions of filtering medium, and also arranged so that when a fluid under pressure is thereafter supplied to said closed spaces that said filter cakes will be loosened from the outside of said partitions of filter medium and will be discharged through the open bottom of said chamber.

4. The apparatus for separating liquids from finely divided solids by filtration which consists of a number of similar vertical chambers, each of which is closed at the sides and top and has suspended therein vertical partitions of filtering medium so arranged as to form of a portion of the space within said chamber vertical spaces which are entirely enclosed except for openings through which vacuum and pressure may be applied thereto, and said chambers arranged in a ring and attached to a suitable driving and supporting mechanism so as to be moved through the same horizontal annular path around a central vertical axis; a central automatic valve having a part thereof arranged to revolve around said central vertical axis with said chambers, said revolving part having separate ports therein corresponding to said chambers and connected by suitable pipes to said enclosed spaces in said chambers and arranged so that vacuum and pressure may be automatically applied to said enclosed spaces in each of said chambers during the passage of said chambers through certain parts of said annular path; together with an annular trough parallel to and beneath the annular path of said chambers and arranged to maintain liquids therein at a relatively constant level and at such level that the lower parts of said chambers will dip slightly into said liquids in passing around said annular path.

5. The apparatus for separating liquids from finely divided solids by filtration which consists of a number of similar vertical chambers, each of which is closed at the sides and top and has suspended therein vertical partitions of filtering medium so arranged as to form of a portion of the space within said chamber vertical spaces which are entirely enclosed except for openings through which vacuum and pressure may be applied thereto, and said chambers arranged in a ring and attached to a suitable driving and supporting mechanism so as to be moved through the same horizontal annular path around a central vertical axis; a central automatic valve having a part thereof arranged to revolve around said central vertical axis with said chambers, said revolving part having separate ports therein corresponding to said chambers and connected by suitable pipes to said enclosed spaces in said chambers and arranged so that vacuum and pressure may be automatically applied to said enclosed spaces in each of said chambers during the passage of said chambers through certain parts of said annular path; together with an annular trough parallel to and beneath the annular path of said chambers and arranged to maintain liquids therein at a relatively constant level and at such level that the lower parts of said chambers will dip slightly into said liquids in passing around said annular path; means for applying vacuum and pressure through said automatic central valve at predetermined places in said path; means for continuously supplying liquid pulp to be filtered to said trough.

6. The apparatus for separating liquids from finely divided solids by filtration which consists of a number of similar vertical chambers, each of which is closed at the sides and top and has suspended therein vertical partitions of filtering medium so arranged as to form of a portion of the space within said chamber vertical spaces which are entirely enclosed except for openings through which vacuum and pressure may be applied thereto, and said chambers arranged in a ring and attached to a suitable driving and supporting mechanism so as to be moved through the same horizontal annular path around a central vertical axis; a central automatic valve having a part thereof arranged to revolve around said central vertical axis with said chambers, said revolving part having separate ports therein corresponding to said chambers and connected by suitable pipes to said enclosed spaces in said chambers and arranged so that vacuum and pressure may be automatically applied to said enclosed spaces in each of said chambers during the passage of said chambers through certain parts of said annular path; together with an annular trough parallel to and beneath the annular path of said chambers and arranged to maintain liquids therein at a relatively constant level and at such level that the lower parts of said chambers will dip slightly into said liquids in passing around said annular path; means for applying vacuum and pressure through said automatic central valve at predetermined places in said path; means for continuously supplying liquid pulp to be filtered to said trough all arranged so that when liquid pulp to be filtered is continuously supplied to said trough and said chambers are continuously moved in one direction around said annular path by the application of power to said supporting and driving mechanism and vacuum and pressure are supplied to said central automatic valve, that in certain parts of the path of said chambers liquid pulp will be drawn up into and fill the open spaces in said chambers and liquid will be drawn through said partitions of filter of medium into said enclosed spaces and be withdrawn therefrom and solids in suspension in said liquid will form filter cakes on the sides of said filter media in the open liquid to be filtered is continuously supplied to said sectors for containing liquid and said chambers are continuously moved in one direction around annular path by the application of power to said supporting and driving mechanism, and vacuum and pressure are supplied to said central automatic valve, that, in the parts of the path of said chambers above said sectors containing liquids, said liquids will be drawn up into and fill said open spaces in said chambers and liquid will be drawn through said partitions of filter medium into said enclosed spaces and be withdrawn therefrom and solids in suspension in said liquid will form filter cakes on the sides of said filter media in said open spaces, and in a part of said path above said discharge sector the filter cakes thus formed will be discharged from said chambers into said sector.

10. The apparatus for separating liquids from finely divided solids by filtration which consists of a number of similar vertical chambers, each of which is closed at the sides and top and has suspended therein vertical partitions of filtering medium so arranged as to form of a portion of the space within said chamber vertical spaces which are entirely enclosed except for openings through which vacuum and pressure may be applied thereto, and said chambers arranged in a ring and attached to a suitable driving and supporting mechanism so as to move though the same horizontal annular path around a central vertical axis; a central automatic valve having a part thereof arranged to revolve around said central vertical axis with said chambers, said revolving part having separate ports therein corresponding to said chambers and connected by suitable pipes to said enclosed spaces in said chambers and arranged so that vacuum and pressure may be automatically applied to said enclosed spaces in each of said chambers during the passage of said chambers through certain predetermined parts of said annular path; together with an annular trough parallel to and beneath the annular path of said chambers and arranged to maintain liquids therein at a relatively constant level and at such level that the lower parts of said chambers will dip slightly into said liquids in passing around their said annular path; a central automatic valve having a part thereof arranged to revolve around said central vertical axis with said chambers, said revolving part having separate ports therein corresponding to said chambers and connected by suitable pipes to said enclosed spaces in said chambers and arranged so that vacuum and pressure may be automatically applied to said enclosed spaces in each of said chambers during the passage of said chambers through certain predetermined parts of said annular path, an annular trough beneath said annular path with radial partitions therein dividing said trough into separate sectors some of which are arranged to contain liquids and one of which sectors is arranged to receive filter cakes dropped from said chambers; means for passing said chambers over said partitions and allowing the lower parts of said chambers to dip into the liquids in said sectors in passing around said annular path.

11. The apparatus for separating liquids from finely divided solids by filtration which consists of a number of similar vertical chambers, each of which is closed at the sides and top and has suspended therein vertical partitions of filtering medium so arranged as to form of a portion of the space within said chamber vertical spaces which are entirely closed except for openings through which vacuum and pressure may be applied thereto, and said chambers arranged in a ring and attached to a suitable driving and supporting mechanism so as to move through the same horizontal annular path around a central vertical axis; a central automatic valve having a part thereof arranged to revolve around said central vertical axis with said chambers, said revolving part having separate ports therein corresponding to said chambers and connected by suitable pipes to said enclosed spaces in said chambers and arranged so that vacuum and pressure may be automatically applied to said enclosed spaces in each of said chambers during the passage of said chambers through certain predetermined parts of said annular path; together with an annular trough parallel to and beneath said annular path with radial partitions therein dividing said trough into separate sectors some of which are arranged to contain liquids, and one of which is arranged to receive filter cakes dropped from said chambers, means to maintain liquids therein at a relatively constant level, and means for passing said chambers over said partitions and allowing the lower parts of said chambers to dip slightly into said liquids in passing around said annular path; means for applying vacuum and pressure through said automatic central valve; means for continuously supplying liquid to be filtered to said sectors for containing liquid.

12. The apparatus for separating liquids from finely divided solids by filtration which consists of a number of similar vertical chambers, each of which is closed at the sides and top and has suspended therein vertical partitions of filtering medium so arranged as to form of a portion of the space within said chamber vertical spaces which are entirely closed except for openings through which vacuum and pressure may be applied thereto, and said chambers arranged in a ring and attached to a suitable driving and supporting mechanism so as to move through the same horizontal annular path around a central vertical axis; a central automatic valve having a part thereof arranged to revolve around said central vertical axis with said chambers, said revolving part having separate ports therein corresponding to said chambers and connected by suitable pipes to said enclosed spaces in said chambers and arranged so that vacuum and pressure may be automatically applied to said enclosed spaces in each of said chambers during the passage of said chambers through certain parts of said annular path; an annular trough beneath said annular path with radial partitions therein dividing said trough into separate sectors some of which are arranged to contain liquids and one of which sectors is arranged to receive filter cakes dropped from said chambers; means for passing said chambers over said partitions and allowing the lower parts of said chamber to dip into the liquids in said sectors in passing around said annular path; means for applying vacuum and pressure through said automatic central valve; means for continuously supplying liquid to be filtered to said sectors for containing liquid; all arranged so that when liquid to be filtered is continuously supplied to said sectors for containing liquid and said chambers are continuously moved in one direction around said annular path by the application of power to said supporting and driving mechanism and vacuum pressure are supplied to said central automatic valve that in the parts of the path of said chambers above said sectors containing liquids said liquids will be drawn up into and fill said open spaces in said chambers and liquid will be drawn through said partitions of filter medium into said enclosed spaces and be withdrawn therefrom and solids in suspension in said liquid will form filter cakes on the sides of said filter media in said open spaces, and in the part of said path above said discharge sector the filter cakes thus formed will be discharged from said chambers into said sector.

13. The apparatus for separating liquids from finely divided solids by filtration which consists of a number of similar vertical chambers each of which is closed at the sides and top and has suspended therein partitions of filtering medium so arranged as to form of a portion of the space within said chamber vertical spaces which are entirely enclosed except for openings through which vacuum and pressure may be applied thereto, and said chambers arranged in a ring and attached to a suitable driving and supporting mechanism so as to move through the same horizontal annular path around a central vertical axis; a central automatic valve having a part thereof arranged to revolve around said central vertical axis with said chambers, said revolving part having separate ports therein corresponding to said chambers and connected by suitable pipes to said enclosed spaces in said chambers and arranged so that vacuum and pressure may be automatically applied to said enclosed spaces in each of said chambers during the passage of said chambers through certain predetermined parts of said annular path; an annular trough beneath said annular path with radial partitions therein dividing said trough into separate sectors some of which are arranged to contain liquids and one of which sectors is arranged to receive filter cakes dropped from said chambers, each of said sectors for containing liquids having notches in the upper part of the end partitions thereof arranged so that the lower parts of said chambers may pass through said notches in moving around said annular path, and each of the said last sectors having an overflow sector at each end to receive the liquid overflowing through said notch and means for continuously returning said overflow liquid from said overflow sectors to the main sector from which it came, all arranged so as to maintain the liquid in said main sectors at a level above the bottom of said notches and the liquid in said overflow sectors at a level below said notches.

14. The apparatus for separating liquids from finely divided solids by filtration which consists of a number of similar vertical chambers, each of which is closed at the sides and top and has suspended therein vertical partitions of filtering medium so arranged as to form of a portion of the space within said chamber vertical spaces which are entirely enclosed except for openings through which vacuum and pressure may be applied thereto, and said chambers arranged in a ring and attached to a suitable driving and supporting mechanism so as to move through the same horizontal annular path around a central vertical axis; a central automatic valve having a part thereof arranged to revolve around said central vertical axis with said chambers, said revolving part having separate ports therein corresponding to said chambers and connected by suitable pipes to said enclosed spaces in said chambers and arranged so that vacuum and pressure may be automatically applied to said enclosed spaces in each of said chambers during the passage of said chambers through certain predetermined parts of said annular path; an annular trough beneath said annular path with radial partitions therein dividing said trough into separate sectors some of which are arranged to contain liquids and one of which sectors is arranged to receive filter cakes dropped from said chambers, each of said sectors for containing liquids having notches in the upper part of the end partitions thereof arranged so that the lower parts of said chambers may pass through said notches in moving around said annular path, and each of the said last sectors having an overflow sector at each end to receive the liquid overflowing through said notch, and means for continuously returning said overflow liquid from said overflow sectors to the main sector from which it came, all arranged so as to maintain the liquid in said main sector at a level above the bottom of said notches and above the bottom of said chambers and the liquid in said overflow sectors at a level below said notches; means for continuously supplying liquid to be filtered to said main sectors for containing liquids and means for maintaining the liquids therein at substantially the same constant level, so that the lower parts of said chambers will dip slightly into said liquid in passing over said main sectors; means for applying vacuum and pressure through said automatic central valve.

In testimony whereof I have signed my name to this specification.

NIELS C. CHRISTENSEN.

Sept. 6, 1927.

E. CLARKE 1,641,737

ELECTRICAL POWER TRANSMISSION

Filed April 30, 1925

Inventor
Edith Clarke,
by *Alexander S. ...*
Her Attorney